March 20, 1945.  G. HOFFMANN  2,371,891

TIRE VALVE

Filed Jan. 22, 1941

Inventor
Georg Hoffmann
By
Blair, Curtis + Hayward
Attorneys

Patented Mar. 20, 1945

2,371,891

UNITED STATES PATENT OFFICE 2,371,891

TIRE VALVE

Georg Hoffmann, Nuremberg, Germany; vested in the Alien Property Custodian

Application January 22, 1941, Serial No. 375,511
In Germany January 26, 1940

5 Claims. (Cl. 251—122)

My invention relates to improvements in tire valves and more particularly in tire valves of the type comprising a slitted disk controlling the supply of air to the air tube of the tire. My improved valve is particularly designed for use in tires of bicycles. But I wish it to be understood that my invention is not limited to such use. In tires of this type the disk is clamped in position by means of parts of the body of the valve engaging the margin of the disk.

The object of the improvements is to provide a valve of the type indicated in which the operation of the disk is not interfered with by the clamping pressure acting on the margin thereof, and in which, further, the disk is not spoiled by excessive pressure. With these objects in view my invention consists in providing means for limiting the movement of the said clamping parts of the valve body towards each other and into clamping engagement with the said disk, the said means being arranged so that the disk is compressed at its margin only so far as is needed for holding the same in position without impairing the proper operation of the disk.

In the preferred construction the said disk is partly embedded within a cavity made in one of the parts of the valve body, so that it slightly projects from the said cavity.

Figure 3:
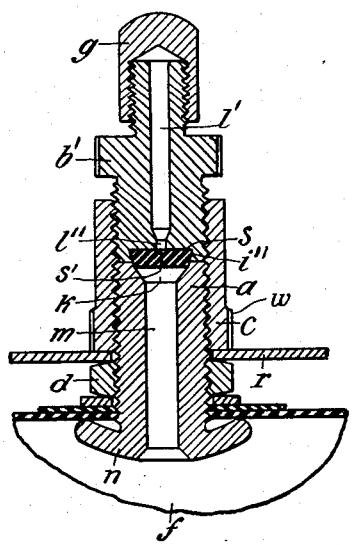
Figure 4:
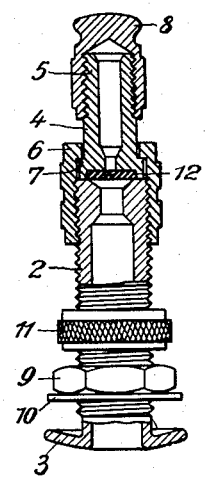

For the purpose of explaining the invention several examples embodying the same have been shown in the accompanying drawing in which the same reference characters have been used in all the views to indicate corresponding parts. In said drawing Fig. 1 is a sectional elevation showing the valve and a part of the tire, the controlling disk being in the position in which the slit is open for permitting the flow of the air into the air tube, Fig. 2 is a plan view of the disk, Fig. 3 is a sectional elevation similar to the one illustrated in Fig. 1 and showing a modification, the controlling disk being in closed position, and Fig. 4 is an elevation partly in section showing another modification.

Figure 1:
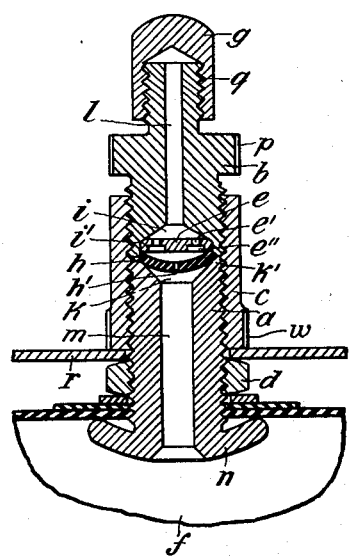
Figure 5:
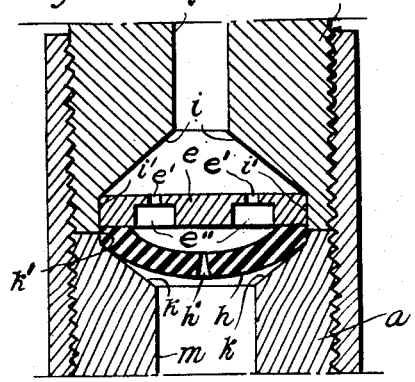

Fig. 5 is an enlarged fragmentary sectional view like Fig. 1 but showing the valve structure more in detail.

Figure 2:
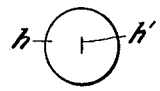

In the construction shown in Figs. 1 and 2 the valve comprises an externally screw-threaded tubular member $a$ formed at its bottom end with a flange $n$, an externally screw-threaded tubular member $b$ formed with a milled flange $p$ and an externally screw-threaded nipple $q$, an internally screw-threaded sleeve $c$ having a milled portion $w$ and connecting the members $a$ and $b$, and a nut $d$ screwing on the member $a$ and cooperating with the flange $n$ for clamping the member $a$ on the air tube $f$ as is known in the art. As shown, the sleeve $c$ cooperates with the nut $d$ for fixing the valve to the rim $r$ of the wheel. Normally the valve is closed by a screw-cap $g$ placed on the nipple $q$. The bore $l$ of the member $b$ ends at its inner end in a conical portion $i$ having a cylindrical margin $i'$, and the bore $m$ of the member $a$ ends at its outer end in a conical portion $k$ having a cylindrical margin $k'$, the said conical and cylindrical portions being coaxial of the bores $l$ and $m$. The conical and cylindrical portions $i$ and $i'$ provide a seat for a metal disk $e$ formed with eccentric bores $e'$ ending in enlarged portions $e''$, the bottom side of the disk $e$ being slightly spaced from the lower end face of the member $b$. Within the circular cavity thus produced a disk $h$ of elastic material such as india rubber is fitted, the depth of the said cavity being smaller than the thickness of the disk $h$ which, therefore, projects from the cavity. The metal disk $e$ and the india rubber disk $h$ are held in position within the said conical and cylindrical portions by the members $a$ and $b$, the member $b$ being screwed into the sleeve $c$ so far that it bears with its lower face on the upper face of the member $a$. Thus, the disk is embedded in the cylindrical portions $i'$ and $k'$, and the relative dimensions of the said cylindrical portions and the rubber disk $h$ are such that slight clamping pressure is exerted on the margin of the disk $h$. The disk $h$ is provided with a slit $h'$ which is normally closed and which is opened only when the disk is bulged downwardly by the external pump pressure. When no external pressure is applied to the valve, the disk $h$ is pressed by the pressure within the air tube $f$ flat on the metal disk $e$, so that the slit $h'$ is closed, the disk $e$ providing a means for thus holding the disk $h$ flat. If however pressure is applied by means of the pump through the body $b$ the disk $h$ is bulged downwardly, so that the slit $h'$ is slightly opened as is shown in Fig. 1, and the disk finds a support on the wall of the conical cavity $k$, so that it is not pressed out of the cylindrical cavities $i'$ and $k'$.

In the construction shown herein, in which the disk $h$ slightly projects from the cylindrical portion $i'$ when the bodies $a$ and $b$ are out of contact with each other the disk $h$ is but slightly compressed at its margin so that the material is not pressed inwardly which would interfere with the opening of the slit $h'$.

In Fig. 3 I have shown a modification in which the disk $e$ is dispensed with, and the rubber disk $s$ is fixed within the tubular body $b'$, for convenience in assembling the parts of the valve. As shown, the member $b'$ is formed at its inner end with a cavity having tapering walls $i''$, and the disk $s$ is fitted in the said cavity and it is held in position therein by the undercut wall $i''$. The bottom of the said cavity $i''$ is plane, and it provides a flat support for the disk $s$. The bore $l'$ in the member $b'$ is reduced in cross-section at its inner end, as is shown at *l"* and the slit *s'* of the disk *s* ends on the said reduced portion *l"*. Otherwise the construction of the disk *s* is similar to the construction of the disk as described with reference to Fig. 1, and the disk is but slightly compressed at its margin when the member *b'* is screwed into the sleeve *c* and into engagement with the member *a*.

In Fig. 4 I have shown a modification in which the construction of the parts of the valve is similar to the construction now in use, in which however the controlling disk has a construction similar to the examples shown in Figs. 1 to 3. More specifically the construction of the controlling disk corresponds to the construction shown in Fig. 3.

The valve comprises an externally screw-threaded tubular member 2 formed with a flange 3, a tubular member 4 formed with a nipple 5, a screw-cap on the member 2 formed with a flange 6 bearing on a shoulder 7 of the member 4, and a cap 8. The tubular member 2 is fixed to the air tube by means of a nut 9 and a washer 10, and it is fixed to the rim of the wheel by means of a nut 11. The construction of the controlling disk 12 is similar to the construction described with reference to Fig. 3.

It appears therefore that in the manufacture of the valve parts of standard shape may be used, and that the operation of the valve is the same as that of valves now in common use.

I claim:

1. A tire valve comprising a rigid body composed of axially divided first and second sections each formed with a bore terminating in a conical chamber the wall of which is cylindrically formed to define half of a cylindrical chamber at the meeting ends of the sections, an assembling member constructed and arranged to hold the sections in abutting relation with the cylindrical walls axially aligned to define the cylindrical chamber, a relatively rigid disk of substantially the same diameter as the side wall of said cylindrical chamber and formed with at least one perforation, said rigid disk having a thickness at its edge less than the axial length of said cylindrical chamber and being engaged with the shoulder defined by said cylindrical chamber in said first section, a flexible and compressible disk fitted in the cylindrical chamber in the space between said rigid disk and the shoulder defined by said cylindrical chamber in the other section and provided with a slit positioned out of register with the perforation in the rigid disk, said flexible and compressible disk being only slightly thicker than the space between said rigid disk and the shoulder in the said other section so as to be clamped therebetween only lightly at its peripheral edge, whereby maximum flexibility of the flexible and compressible disk is provided for when the air pressure at the axially outward side of the rigid disk exceeds that at the axially outward side of the flexible and compressible disk whereby the flexible disk can bulge away from the rigid disk, and whereby the flexible disk can flatten and become compressed against the rigid disk to occlude the perforation therein and prevent passage of air therethrough when the air pressure is greater at the axially outward side of the flexible and compressible disk.

2. A tire valve according to claim 1 wherein the slit in said flexible and compressible disk is centrally located and the perforation in said rigid disk is eccentrically located therein.

3. A tire valve comprising a rigid body composed of a pair of sections each having a longitudinal bore formed therethrough, the bore in one of said sections terminating at its axially inward end in a flaring chamber terminating at its wider end in a substantially cylindrical portion opening through the inner end of the section, means securing the sections together with their inner ends in abutting engagement, a flexible and compressible disk seated in said cylindrical portion and retained against movement into said the bore in said one section solely by the engagement of its edge with the flared walls of said chamber, said disk being thick enough to extend into engagement with the adjacent end of the remaining section whereby said outer edge of the disk is lightly compressed between the said flared walls and the end of the said remaining section with the remainder of the disk extending across and normally closing the inner end of the bore in the said remaining section, said disk being provided with a slit to establish communication between the two bores wherever pressure at the side of the disk opposite that facing said chamber is greater than that of the pressure in the chamber.

4. A tire valve according to claim 3 wherein the inner end of the said remaining section is substantially circularly recessed to conformably receive a portion of the adjacent side of the disk.

5. A valve for a tire or the like comprising two endwise connected tubular sections having their facing ends abutted and formed with axial conical recesses communicating with the bores and having their wider ends registered, the said wider ends of the conical recesses terminating in relatively shallow cylindrical portions together defining a cylindrical chamber with conical ends, a rigid disk fitting said chamber with its edge resting against one conical end of said chamber in axially spaced relation to the other conical end of said chamber, a flexible and compressible disk also fitting said chamber and occupying the space between the rigid disk and the said other conical end of the chamber, said flexible and compressible disk being only slightly thicker than the axial dimension of said space whereby it is only lightly compressed at its edge between the rigid disk and the last mentioned conical end of the chamber, the light compression of the edge of the flexible and compressible disk and the narrowness of the bearing thereon of the last mentioned conical end of the chamber permitting said flexible and compressible disk maximum freedom for flexing relative to the rigid disk, said rigid disk being provided with an eccentric perforation and said flexible and compressible disk being formed with a centrally located normally closed slit arranged to open only when an excess of fluid pressure exists at the outer side of the rigid disk and is exerted through the perforation in the rigid disk in a direction to bulge said flexible and compressible disk away from said rigid disk and against the walls of the adjacent conical recess, said flexible and compressible disk being arranged to flex and compress so as to close the slit therein and conform with the rigid disk when an excess pressure exists at the outer side of said flexible and compressible disk.

GEORG HOFFMANN.